United States Patent [19]

Link

[11] 4,351,201

[45] Sep. 28, 1982

[54] CRANKSHAFT ASSEMBLY

[75] Inventor: Manfred Link, Nuremberg, Fed. Rep. of Germany

[73] Assignee: Triumph-Adler A.G., Fed. Rep. of Germany

[21] Appl. No.: 209,044

[22] Filed: Nov. 21, 1980

[30] Foreign Application Priority Data

Jun. 24, 1980 [DE] Fed. Rep. of Germany ....... 3023473

[51] Int. Cl.³ .............................................. F16C 3/10
[52] U.S. Cl. ....................................... 74/598; 403/393
[58] Field of Search ................... 74/597, 598; 403/393

[56] References Cited

U.S. PATENT DOCUMENTS 1,515,162  11/1924  Murray et al. ........................ 74/597
4,080,084  3/1978  Williams ............................. 403/393

FOREIGN PATENT DOCUMENTS 879489  6/1953  Fed. Rep. of Germany ........ 74/597
220136  8/1924  United Kingdom ................ 403/393

Primary Examiner—Kenneth Dorner
Attorney, Agent, or Firm—Joseph R. Spalla

[57] ABSTRACT

A crankshaft assembly for precision low load applications has cylindrical crankpins mounted on concave peripheral grooves on the ends of a crankshaft and coupled thereto by clamps which lockingly engage aligned annular grooves in the crankshaft and crankpin.

3 Claims, 3 Drawing Figures

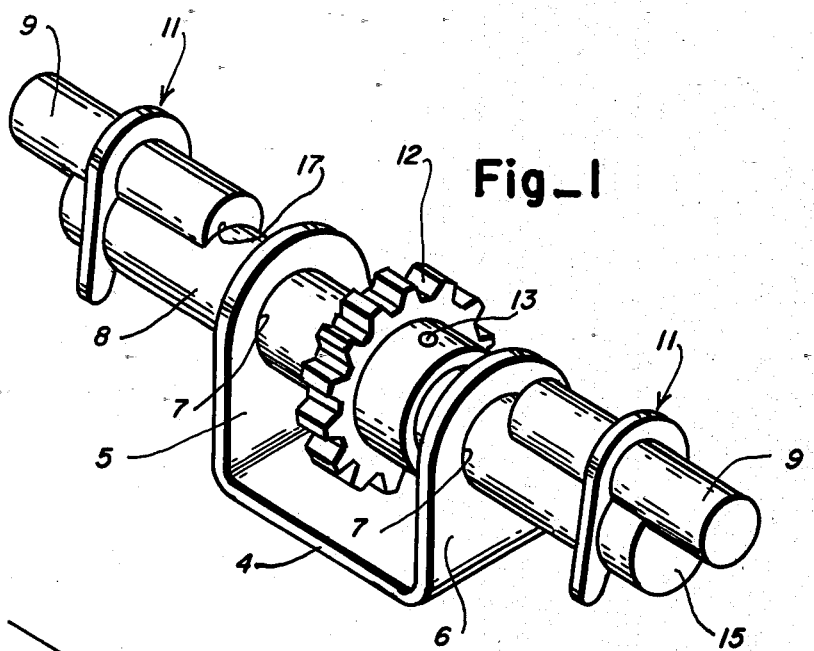
Fig_1
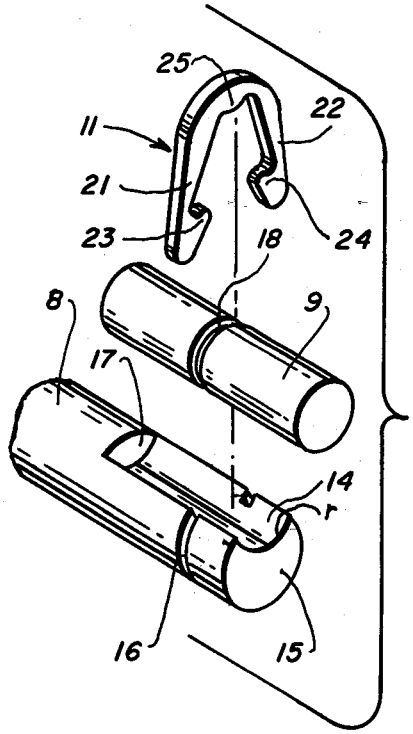
Fig_2
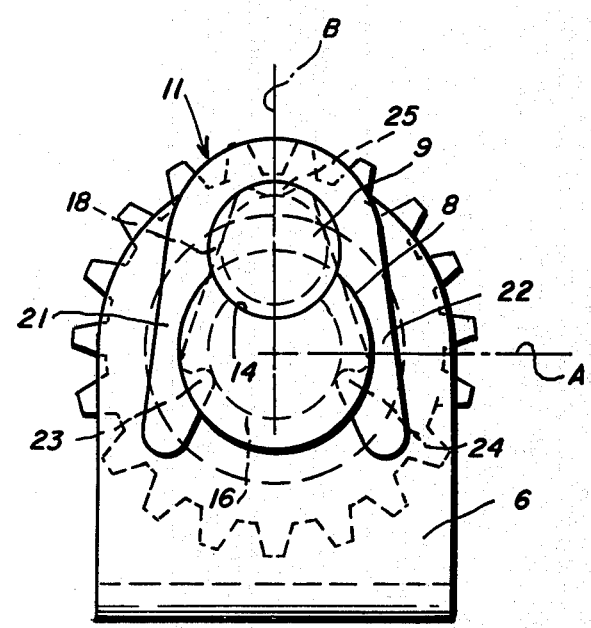
Fig_3

CRANKSHAFT ASSEMBLY

This invention relates to crankshafts; more particularly it relates to a crankshaft assembly having means for connecting a crankpin to a crankshaft; and specifically it relates to a crankshaft assembly in which the connecting means is a push on clamp for engaging aligned annular grooves in the crankshaft and crankpin mounted on and parallel to the ends of the crankshaft and lockingly engaging same.

Common practice is to form crankpins integral with a crankshaft or to mount them on plates attachable to the end or ends of the crankshaft. Both expedients are costly to manufacture and assemble. Too, an integrally formed crankshaft and crankpin has limited application, for example, in applications where crankpins must be provided on both ends of a crankshaft. In such applications the crankshaft is rotatably supported between spaced arms of a frame which are located inwardly of the crankpins, making assembly impossible. In such an application crankpins mounted on plates or bushings for assembly to the crankshaft ends, must be resorted to but such plates or bushings require additional space which is often not available in precision mechanisms.

In accordance with the invention the crankshaft assembly allows first the mounting of the crankshaft through a bearing part and provides an arrangement whereby crankpins can be mounted parallel to the ends of the crankshaft and coupled thereto by simple clamping means.

It is an object of the invention, therefore, to provide a crankshaft assembly which is easy to produce and can readily be assembled.

Other objects, features and advantages of the present invention will become known to those skilled in the art from a reading of the following detailed description when taken in conjunction with the accompanying drawing wherein like reference numerals designate like or corresponding parts throughout the several views thereof, and wherein:

FIG. 1 a perspective view of a crankshaft assembly;

FIG. 2, in larger scale, is an exploded perspective view of various parts of a crankshaft assembly according to the invention; and FIG. 3 is an right end view of the crankshaft assembly as shown in FIG. 1.

Referring now to the drawing there is shown in FIG. 1 a crankpin assembly comprising a U-shaped bearing bracket 4 whose spaced parallel upstanding arms 5 and 6 are provided with bores 7 for rotatably supporting a crankshaft 8. Crankpins 9, retained by means of clamps, generally designated by reference numeral, 11 in a manner to be described, are provided on both ends of the crankshaft 8. Mounted axially on the crankshaft 8 between the support arms 5 and 6 is a drive gear 12 which is fixed to the crankshaft by means of a pin, set screw 13 or the like. As is evident from FIG. 1 a crankshaft 8 integrally formed with crankpins 9 could not be assembled to the bearing bracket.

With particular reference to FIG. 2 the periphery of the crankshaft 8 is provided with a concave recess 14 which extends in axial direction back from the end 15, and with an annular groove 16 located between the crankshaft end 15 and a shoulder 17 formed by the concave recess 14. The crankpin 9, shown as having a radius equal to the radius r of the recess 14, is provided between its ends with an annular groove 18. The clamp 11 takes a generally V-shaped form whose legs 21 and 22 terminate in inwardly directed lugs 23, 24. Another inwardly directed lug 25 is formed at the junction of the legs 21, 22 of the clamp 11.

With particular reference to FIGS. 2 and 3, a crankpin 9 is first mounted in the concave recess 14 of the crankshaft 8 so that the annular slots 16 and 18 are aligned and the inward end of the crankpin 9 abuts the shoulder 17. The clamp 11 is then pushed into the annular grooves 16 and 18, the lugs 23 and 24 on the ends of the legs 21, 22 engaging and flexing over the annular groove 16 in the crankshaft 8. In its final position as viewed in FIG. 3 the clamping lugs 23 and 24 are located below the horizontal center line A of and grip the crankshaft 8 while the lug 25 is located in the annular groove 18 of the crankpin 9 aligned opposite the vertical center line B through the crankshaft 8 and crankpin 9. This causes the clamp 11 to exert a clamping effect which presses the crankpin firmly into the recess 14 of the crankshaft 8.

As may be appreciated from FIG. 1, one end of crankshaft 8 may be pushed through the bearing bore 7 in arm 6 of the bearing bracket 4, the gear 12 axially mounted thereon, and the crankshaft 8 pushed through the bore 7 in the second bearing leg 7. Then the crankpins 9 may is assembled to either end of the crankshaft 8 by means of clamps 11 in the previously described manner. After fixing the gear 12 to the crankshaft 8 by means of the pin 8 the assembly is ready for use.

The invention is particularly advantageous in precision mechanisms, in which forces to be transmitted through the crankpins 9 are low in that it permits simple assembly or disassembly.

It is to be understood that the invention also contemplates recesses 14 and, if applicable, crankpins 9 with different profiles. It is only important that the annular slots 16 and 18 be in exact alignment and so dimensioned that the clamp 11, and hence the crankpin 9, have no clearance in axial direction of the crankshaft 8.

The invention claimed is:

1. A crankshaft assembly comprising a bearing having spaced arms,
    a shaft supported for rotation between said arms with its ends extending outwardly from said arms,
    at least one of said shaft ends having a recess on its periphery axially extending back toward one of said arms and an annular groove intersecting said recess,
    a crankpin mounted in said recess with its axis parallel to said shaft axis,
    said crankpin having an annular groove in alignment with said annular groove in said shaft, and
    clamp means mounted in said aligned grooves resiliently embracing said shaft and urging said crankpin against said recess.

2. A crankshaft assembly as recited in claim 1, said recess being concave and having a radius equal to the radius of said crankpin.

3. A crankshaft assembly as recited in claim 1,
    said clamp means having a V-shape, the ends of whose legs resiliently embrace said shaft below a horizontal center line of said shaft which is perpendicular to a line through the centers of said crankpin and shaft, and
    a locking lug at the junction of said legs extending into the annular groove of said crankpin.

* * * * *